US008090721B2

(12) United States Patent  
Fogel

(10) Patent No.: US 8,090,721 B2  
(45) Date of Patent: Jan. 3, 2012

(54) METHOD AND DEVICE FOR CLUSTERING CATEGORICAL DATA AND IDENTIFYING ANOMALIES, OUTLIERS, AND EXEMPLARS

(75) Inventor: David B. Fogel, San Diego, CA (US)

(73) Assignee: Natural Selection, Inc., San Diego, CA (US)

( * ) Notice: Subject to any disclaimer, the term of this patent is extended or adjusted under 35 U.S.C. 154(b) by 0 days.

(21) Appl. No.: 12/714,489

(22) Filed: Feb. 27, 2010

(65) Prior Publication Data

US 2010/0161609 A1  Jun. 24, 2010

Related U.S. Application Data

(62) Division of application No. 10/959,731, filed on Oct. 6, 2004, now Pat. No. 7,707,148.

(60) Provisional application No. 60/509,422, filed on Oct. 7, 2003.

(51) Int. Cl.
*G06F 17/30* (2006.01)
*G06F 7/00* (2006.01)

(52) U.S. Cl. ........................................................ 707/737

(58) Field of Classification Search .................... 707/737
See application file for complete search history.

(56) References Cited

U.S. PATENT DOCUMENTS

| | | | |
|---|---|---|---|
| 5,214,715 A | 5/1993 | Carpenter et al. | |
| 5,410,634 A | 4/1995 | Li | |
| 5,802,506 A | 9/1998 | Hutchison | |
| 5,822,273 A | 10/1998 | Bary et al. | |
| 5,978,785 A | 11/1999 | Johnson et al. | |
| 6,006,223 A | 12/1999 | Agrawal et al. | |
| 6,038,556 A | 3/2000 | Hutchison | |
| 6,131,110 A | 10/2000 | Bates et al. | |
| 6,144,954 A | 11/2000 | Li | |
| 6,308,172 B1 | 10/2001 | Agrawal et al. | |
| 6,622,004 B1 | 9/2003 | Sonoda et al. | |
| 6,862,540 B1* | 3/2005 | Welch et al. | 702/44 |
| 6,952,700 B2 | 10/2005 | Modha et al. | |
| 7,908,159 B1 | 3/2011 | Ordonez et al. | |
| 2002/0184080 A1* | 12/2002 | Murad et al. | 705/10 |
| 2003/0101009 A1* | 5/2003 | Seem | 702/61 |
| 2004/0006447 A1 | 1/2004 | Gorin | |

OTHER PUBLICATIONS

Fogel, David, declaration, May 18, 2005, 1 page.
IBM-Technical Disclosure Bulletin, "Flexible Adaptation Method with Radii Training for the Recognition Library Management" Jun. 1993, NB930681.

* cited by examiner

*Primary Examiner* — Sathyanarayan Pannala
(74) *Attorney, Agent, or Firm* — Law Office of Gerald Maliszewski; Gerald Maliszewski

(57) ABSTRACT

One aspect of the invention is a method for assigning categorical data to a plurality of clusters. The method may include identifying a plurality of categories associated with the data. The method also may include, for each category in the plurality of categories, identifying at least one element associated with the category. The method also may include specifying a number of clusters to which the data may be assigned. The method additionally may include assigning at least some of the data, wherein each assigned datum is assigned to a respective one of the clusters. The method further may include, for at least one of the clusters, determining, for at least one category, the frequency in data assigned to the cluster of at least one element associated with the category. Further, the invention may provide for detecting outliers, anomalies, and exemplars in the categorical data.

15 Claims, 10 Drawing Sheets

METHOD AND DEVICE FOR CLUSTERING CATEGORICAL DATA AND IDENTIFYING ANOMALIES, OUTLIERS, AND EXEMPLARS

CROSS-REFERENCE TO RELATED APPLICATIONS

This application is a divisional of U.S. patent application Ser. No. 10/959,731 filed Oct. 6, 2004 now U.S. Pat. No. 7,707,148, titled "Method and device for clustering categorical data and identifying anomalies, outliers, and exemplars", which is incorporated herein by this reference, which claims the benefit of U.S. Provisional Patent Application No. 60/509,422, filed Oct. 7, 2003, titled, "Method and Device for Clustering Categorical Data and Identifying Anomalies, Outliers, and Exemplars", which is incorporated herein by this reference.

BACKGROUND

1. Technical Field

The present invention relates to assigning data to clusters. More particularly, some examples of the invention concern assigning categorical data to clusters and/or identifying outliers and/or anomalies in the categorical data.

2. Description of Related Art

The problem of clustering concerns finding groupings of data where data gathered together in each group are similar, and are at the same time different from those in other groups. Clustering has received a great deal of attention for numeric data. In this case, it is easy to construct mathematical formulas to measure the degree of similarity and separation between data points. One such method is known as k-means, where the person who wants to cluster data chooses the number of clusters (k) ahead of time, and assigns each data point to one of the k clusters with the objective of finding the assignment that minimizes:

$$\Sigma(i=1, \ldots, k)\Sigma(j=1, \ldots, n_i)\|x_j - \mu_i\|^2$$

where $\|x_j - \mu_i\|^2$ is the Euclidean distance between vectors $x_j$ and $\mu_i$, $\mu_i$ is the hypothesized mean of the ith cluster, $x_j$ is the jth point assigned to cluster i, where there are $n_i$ such points, j iterates from 1 to the number of points in each cluster, $n_i$, and i iterates from 1 to the number of clusters k. In the case where x and μ are not vectors but are instead scalar numbers, the distance is calculated as the square of the difference between the two numbers. The k-means approach seeks to minimize the within-cluster distance of every point assigned to the cluster to the mean of the cluster.

While k-means and other methods have been developed for clustering numeric data, categorical data present significant difficulties for these methods. Categorical data are data in which the data elements are nonnumeric. For example, within a category of fruit, there may be apples, bananas, pears, and so forth. Within another category of colors, they may be red, yellow, and green. A clustering problem might require grouping data consisting of these fruits and colors, rather than a numeric characteristic associated with the fruits (e.g., length, volume) or colors (e.g., intensity, wavelength).

After data are clustered, it is often of interest to identify those data that are not well associated with any cluster. When treating numeric data, this is often accomplished by determining the minimum distance from any particular data point to a center of mass (center) of a cluster (for example, the mean of all points assigned to a cluster). If a point is not sufficiently close to the center of any cluster then it can be regarded as an "outlier" or "anomaly." Distance is typically calculated in terms of the common Euclidean metric:

$$\Sigma(i=1, \ldots, n)\|x_i - y_i\|^2$$

where there are n points, $x_1, \ldots, x_n$, and n points $y_1, \ldots, y_n$ and the function $\|\bullet\|^2$ is:

$$\mathrm{Sqrt}[(x_1-y_1)^2 + (x_2-y_2)^2 + \ldots + (x_n-y_n)^2]$$

and Sqrt is the square root function. Although these techniques are useful for numeric data, known techniques are inadequate for clustering categorical data and for identifying categorical data that are not well associated with any cluster.

SUMMARY

One aspect of the invention is a method for assigning categorical data to a plurality of clusters. An example of the method includes identifying a plurality of categories associated with the data. This example also includes, for each category in the plurality of categories, identifying at least one element associated with the category. This example also includes specifying a number of clusters to which the data may be assigned. This example additionally includes assigning at least some of the data, wherein each assigned datum is assigned to a respective one of the clusters. This example further includes, for at least one of the clusters, determining, for at least one category, the frequency in data assigned to the cluster of at least one element associated with the category. Further, some examples of the invention provide for detecting outliers, anomalies, and exemplars in the categorical data.

Other aspects of the invention are described in the sections below, and include, for example, a computing system, and a signal-bearing medium tangibly embodying a program of machine-readable instructions executable by a digital processing apparatus to perform operations for assigning categorical data to a plurality of clusters and/or for detecting outliers, anomalies, and exemplars in clustered categorical data.

Some examples of the invention advantageously permit assigning categorical data to clusters and computing a measure of the quality of the clustering. Some examples of the invention beneficially provide for iteratively adjusting the assignment of data to clusters to improve the measure of quality of the clustering. Some examples of the invention advantageously detect outliers, anomalies, and exemplars in clustered categorical data. The invention also provides a number of other advantages and benefits, which should be apparent from the following description.

DETAILED DESCRIPTION

Figure 1:
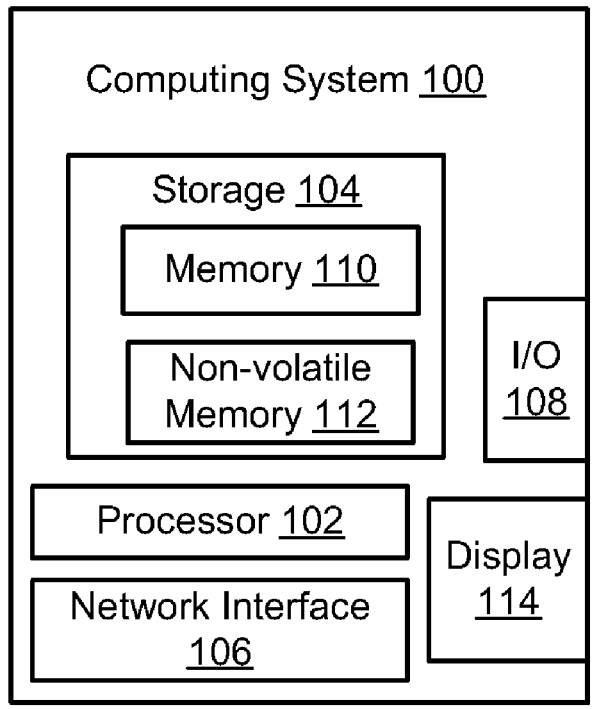
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system (also called a computing device, or device) for assigning categorical data to a plurality of clusters, and/or, for detecting outliers, anomalies, and/or exemplars in clustered categorical data. As an example, the computing system may be embodied by all, or portions of, the exemplary computing system 100 shown in FIG. 1. Some examples of the invention may be utilized with data other than categorical data.

The computing system 100 includes a processor 102 (which may be called a processing device), and in some examples could have more than one processor 102. As an example, the processor may be a processor manufactured by Intel Corporation. The processor 102 may run any suitable operating system, for example, Windows XP, Windows 2000, AIX, Solaris™, Linux, UNIX, or HP-UX™. The computing system 100 may be implemented on any suitable computer, for example a hand-held computer, a personal computer, a workstation, a mainframe computer, or a supercomputer. The computing system 100 also includes a storage 104, a network interface 106, and an input/output 108, which are all coupled to the processor 102. The storage 104 may include a primary memory 110, which for example, may be RAM, and a non-volatile memory 112. The non-volatile memory 112 could be, for example, a hard disk drive, a drive for reading and writing from optical or magneto-optical media, a tape drive, non-volatile RAM (NVRAM), or any other suitable type of storage. The storage 104 may be used to store data and application programs and/or other programming instructions executed by the processor. The network interface 106 may provide access to any suitable wired or wireless network or communications link. The computing system 100 may also include a display 114, for displaying information to a user.

II. Operation

In addition to the hardware embodiments described above, other aspects of the invention concern operations for assigning categorical data to a plurality of clusters, and/or, for detecting outliers, anomalies, and/or exemplars in clustered categorical data. Some examples of the invention may be utilized with data other than categorical data.

A. Signal-Bearing Media

In the context of FIG. 1, the method aspects of the invention may be implemented, for example, by having processor 102, execute a sequence of machine-readable instructions, which can also be referred to as code, for carrying out one or more examples of the invention or portions of the invention. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform operations for assigning categorical data to a plurality of clusters, and/or, for detecting outliers, anomalies, and/or exemplars in clustered categorical data.

Figure 2:
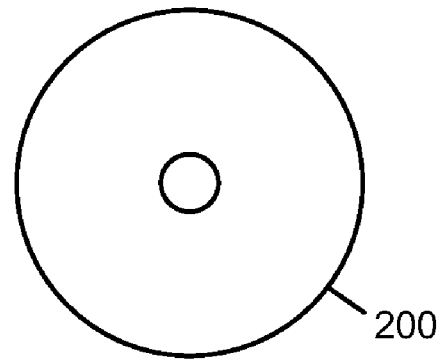
FIG. 2 is an example of a signal-bearing medium in accordance with an example of the invention.

This signal-bearing medium may comprise, for example, primary memory 110 and/or non-volatile memory 112. Alternatively, the instructions may be embodied in a signal-bearing medium such as the optical data storage disc 200 shown in FIG. 2. The optical disc can be any type of signal-bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard disk drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal-bearing media embodying the instructions or code may comprise a transmission media, such as a network transmission line, wireless transmission media, signals propagating through space, radio waves, and/or infrared signals. Alternatively, the signal-bearing media may be implemented in hardware logic, for example, an integrated circuit chip, a Programmable Gate Array (PGA), or an Application Specific Integrated Circuit (ASIC). As an example, the machine-readable instructions may comprise microcode, or may comprise software object code, compiled from a language such as "C++".

B. General Discussion of Operation

Figure 3:
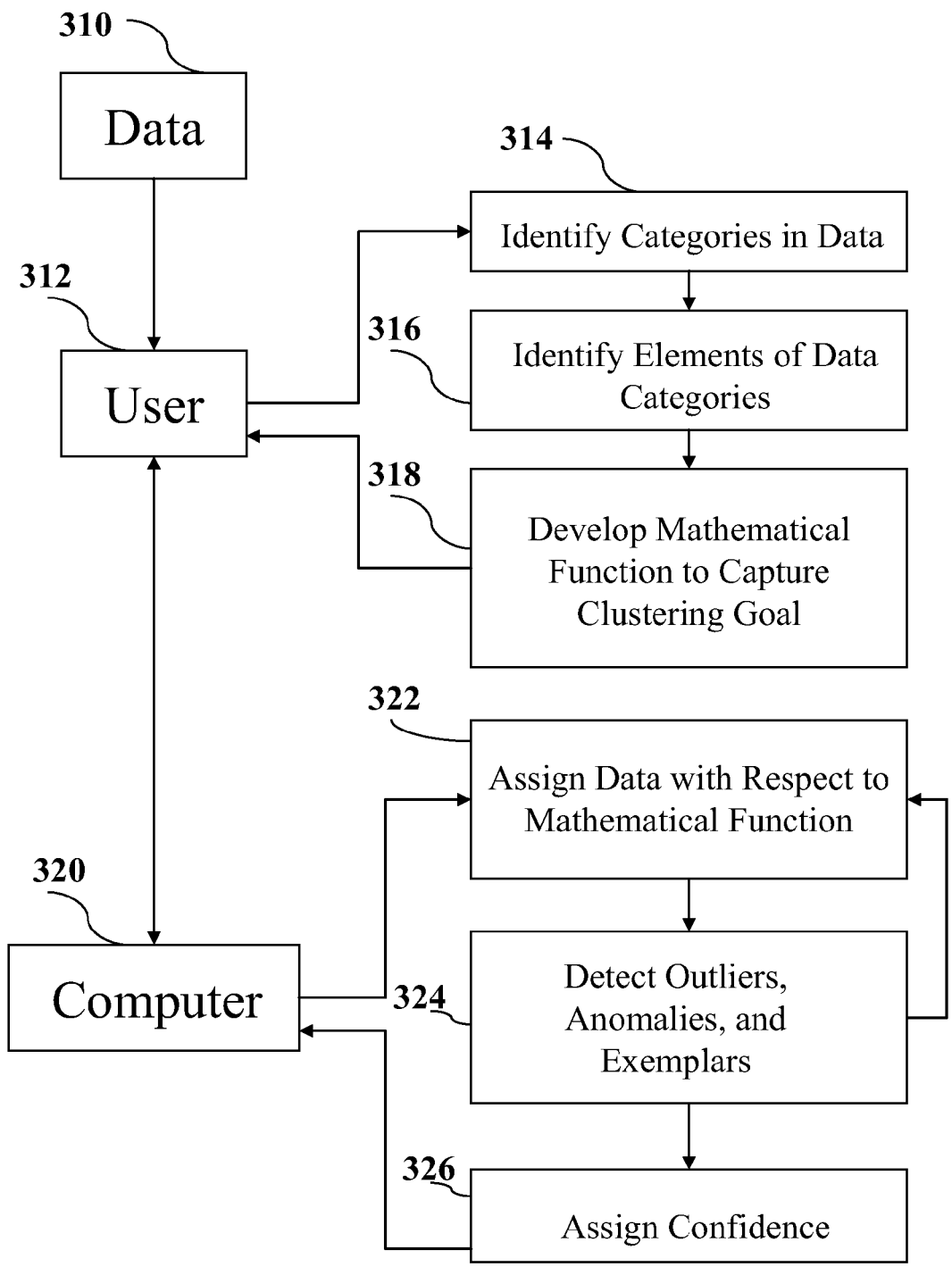
FIG. 3 is a block diagram showing aspects of a method and device for clustering categorical data and for identifying anomalies, outliers, and exemplars in accordance with an example of the invention.

| Reference Numerals in FIG. 3: | |
| --- | --- |
| 310 | Data |
| 312 | User |
| 314 | Identify Categories in Data |
| 316 | Identify elements of data categories |
| 318 | Develop mathematical function to capture clustering goal |
| 320 | Computer |
| 322 | Assign data with respect to mathematical function |
| 324 | Detect outliers, anomalies, and exemplars |
| 326 | Assign confidence on distinction of an outlier, anomaly, and/or exemplar. |

Some examples of the invention provide a method for categorical clustering. Further, some examples of the invention provide a method for determining a statistic that measures the degree to which a data point comprising categorical data belongs to a cluster.

A preferred embodiment of an example of an aspect of the present invention is illustrated in FIG. 3. Data 310 are presented to a user 312 that identifies a number of categories in the data 314 wherein each of the categories comprises different elements 316. Assignment of these categorical data to clusters provides a means of interpreting the data in a more efficient and meaningful manner, however the assignment of categorical data to clusters (known as the "clustering problem") should be made so as to maximize similarity between data in each cluster and maximize disparity between data in different clusters, regardless of the number of clusters or the number of categories or elements in each category. Some examples of the present invention encapsulate this goal as a mathematical function 318. The user 312 interacts with a computer 320 which is used to assign data to individual clusters so as to find the best value of the mathematical function 322. Outliers, anomalies, and exemplars can be detected 324 through an iterative procedure while optimizing over the mathematical function. An assignment of confidence on the distinction of an outlier, anomaly, and/or exemplar 326 can be made using this method and provided back to the computer 320 and/or user 312.

Consider the case where data 310 are arranged by a user 312 in some number of identified categories 314, n, where $C_i$ is the ith and i=1, . . . , n. For example, there may be categories of $C_1$=Fruit, $C_2$=Color, $C_3$=Shape, and $C_4$=Texture. Each of the categories comprises different elements 316. Suppose elements of $C_1$ are "apple," "orange," and "banana"; elements of $C_2$ are "red," "orange," "green," and "yellow"; elements of $C_3$ are "round," and "long and thin"; and elements of $C_4$ are "smooth," and "dimpled". Note that the number of elements in each category need not be equal, and also note that elements of the same label may appear in different categories (e.g., orange appears in $C_1$ and $C_2$) but are treated as being unique to the category in question (therefore the orange in $C_1$ has no intrinsic relationship to the orange in $C_2$; they are strings of characters and happen to be the same strings). Thus, elements of the same label in different categories are different elements. Data may be presented containing multiple instances of these categories and elements. For example:
Data #1: {Apple, Red, Round, Smooth}
Data #2: {Apple, Yellow, Round, Smooth}
Data #3: {Orange, Orange, Round, Dimpled}
Data #4: {Orange, Orange, Round, Dimpled}
Data #5: {Orange, Orange, Round, Dimpled}
Data #6: {Banana, Yellow, Long and Thin, Smooth}
Data #7: {Banana, Yellow, Long and Thin, Smooth}
Data #8: {Banana, Green, Long and Thin, Smooth}
Data #9: {Apple, Green, Round, Smooth}
Data #10: {Apple, Red, Round, Smooth}

These data (each of which may be called a datum) could be assigned to clusters intuitively in different ways. Suppose the choice were to use three clusters. The data could be clustered by any of the single categories. For example:
Cluster 1={Data #1, Data #2, Data #9, Data #10}
Cluster 2={Data #3, Data #4, Data #5}
Cluster 3={Data #6, Data #7, Data #8}
would represent clustering in terms of the similarities and differences in the category of fruit ($C_1$). Note that each type of fruit is assigned to its own cluster, thus maximizing the similarity of fruits in each cluster, and also maximizing the differences between clusters in this category as well. A clustering of
Cluster 1={Data #1, Data #3, Data #9, Data #10}
Cluster 2={Data #2, Data #4, Data #8}
Cluster 3={Data #6, Data #7, Data #5}
would not be as appropriate, intuitively, because the data within each cluster are more disparate in many regards than in the previous example, and there are more similarities between data in different clusters.

Alternatively, the data could be clustered by:
Cluster 1={Data #1, Data #10, Data #8, Data #9}
Cluster 2={Data #2, Data #6, Data #7}
Cluster 3={Data #3, Data #4, Data #5}
which clusters by similarities and differences in colors ($C_2$). Note that there are four colors and by the choice to use three clusters, it is necessary to assign more than one color to some cluster. Thus Cluster 1 includes all red and green data, while Cluster 2 has all yellow data, and Cluster 3 has all orange data. Those skilled in the art of statistical clustering will immediately recognize that other assignments of colors to clusters would be just as intuitive in grouping similar colors, and that clustering could be performed with regard to any category. The number of clusters does not need to be correlated with the number of elements in categories. The clustering problem is to assign the data to the clusters so as to maximize similarity between data in each cluster, and maximize disparity between data in different clusters, regardless of the number of clusters or the number of categories or elements in each category.

The above examples provide intuitive clustering of the data. This intuition must be put in a mathematical framework to make a practical method of clustering. That is, a mathematical function 318 is required that captures the goal of clustering such that alternative groupings of data can be assessed in light of the function, where those groupings that are intuitively better are favored mathematically over those that are intuitively less well suited.

One such function offered in some examples of the present invention requires the person who wants to cluster data to tally the number of instances of each element in each category throughout all the data, and then tally the number of instances of each element in each category in each cluster as the data are assigned. Using these calculations, the person calculates the fraction of each element in each category that is contained in that cluster. The person then determines the overall measure of how effective the possible clustering is by computing the squared difference between the fraction of each element of each category in each pair of clusters, and summing these differences. (As an example, a computer or other type of computing device may be used to perform these calculations.) For example, in the case of:
Data #1: {Apple, Red, Round, Smooth}
Data #2: {Apple, Yellow, Round, Smooth}
Data #3: {Orange, Orange, Round, Dimpled}
Data #4: {Orange, Orange, Round, Dimpled}
Data #5: {Orange, Orange, Round, Dimpled}
Data #6: {Banana, Yellow, Long and Thin, Smooth}
Data #7: {Banana, Yellow, Long and Thin, Smooth}
Data #8: {Banana, Green, Long and Thin, Smooth}
Data #9: {Apple, Green, Round, Smooth}
Data #10: {Apple, Red, Round, Smooth}
The first tally yields:

| Fruit | Color | Shape | Texture |
| --- | --- | --- | --- |
| Apple (4) | Red (2) | Round (7) | Smooth (7) |
| Orange (3) | Yellow (3) | Long/Thin (3) | Dimpled (3) |
| Banana (3) | Orange (3) | | |
| | Green (2) | | | for the clustering of:
Cluster 1={Data #1, Data #2, Data #9, Data #10}
Cluster 2={Data #3, Data #4, Data #5}
Cluster 3={Data #6, Data #7, Data #8}
The second tally and ratio yields:
Cluster 1={Apple (4/4), Orange (0/3), Banana (0/3); Red (2/2), Yellow (1/3), Orange (0/3), Green (1/2); Round (4/7), Long/Thin (0/3); Smooth (4/7), Dimpled (0/3)}
Cluster 2={Apple (0/4), Orange (3/3), Banana (0/3); Red (0/2), Yellow (0/3), Orange (3/3), Green (0/2); Round (3/7), Long/Thin (0/3); Smooth (0/7), Dimpled (3/3)}
Cluster 3={Apple (0/4), Orange (0/3), Banana (3/3); Red (0/2), Yellow (2/3), Orange (0/3), Green (1/2); Round (0/7), Long/Thin (3/3); Smooth (4/7), Dimpled (0/3)}
The sum of the squared differences between all pairs of clusters is computed for each element (Apple, Orange, Banana, Red, Yellow, etc.) using Cluster 1 and Cluster 2, Cluster 2 and Cluster 3, and Cluster 1 and Cluster 3:

Squared Difference (Cluster 1, Cluster 2)={1, 1, 0, 1, 1/9, 1, 1/4, 1/49, 0, 16/49, 1}

Squared Difference (Cluster 2, Cluster 3)={0, 1, 1, 0, 4/9, 1, 1/4, 9/49, 1, 16/49, 1}

Squared Difference (Cluster 3, Cluster 1)={1, 0, 1, 1, 1/9, 0, 0, 16/49, 1, 0, 0}

Each of these squared differences is summed for an overall measure of 16.35034. This number can be compared to the number that would result from the assignment of data to clusters as:

Cluster 1={Data #1, Data #3, Data #9, Data #10}
Cluster 2={Data #2, Data #4, Data #8}
Cluster 3={Data #6, Data #7, Data #5}
Cluster 1={Apple (3/4), Orange (1/3), Banana (0/3); Red (2/2), Yellow (0/3), Orange (1/3), Green (1/2); Round (4/7), Long/Thin (0/3); Smooth (3/7), Dimpled (1/3)}
Cluster 2={Apple (1/4), Orange (1/3), Banana (1/3); Red (0/2), Yellow (1/3), Orange (1/3), Green (1/2); Round (2/7), Long/Thin (1/3); Smooth (2/7), Dimpled (1/3)}
Cluster 3={Apple (0/4), Orange (1/3), Banana (2/3); Red (0/2), Yellow (2/3), Orange (0/3), Green (1/2); Round (1/7), Long/Thin (2/3); Smooth (2/7), Dimpled (1/3)}
with the squared differences of:

Squared Difference (Cluster 1, Cluster 2)={1/4, 0, 1/9, 1, 1/9, 0, 0, 4/49, 1/9, 1/49, 0}

Squared Difference (Cluster 2, Cluster 3)={1/16, 0, 1/9, 0, 1/9, 1/9, 0, 1/49, 1/9, 0, 0}

Squared Difference (Cluster 3, Cluster 1)={9/16, 0, 4/9, 1, 4/9, 1/9, 0, 9/49, 4/9, 1/49, 0}

The sum of these squared differences is 5.4237528. This is a lower score than 16.35034, which indicates that the former possible clustering is better than this latter clustering.

The example illustrates the case of clustering based on the frequency of each element within each cluster. The method can be extended to consider the co-relationships between elements of different categories, which is integral to the purpose of most clustering applications on categorical data. That is, considering only the individual frequencies of elements is not sufficient; it is important to cluster data based on the relationships between elements of difference categories (e.g., how often does "red" appear with "apple" in one group versus another). This can be accomplished by considering additional frequencies that correspond to the number of occurrences of all paired elements across categories. In a manner similar to computing the frequencies for single elements, all pairs of elements can be tallied and the instances of these pairs can be identified in each proposed grouping and treated in the same manner as the single-element frequencies. The details of a complete analysis of paired relations are tedious to offer in an example, but they are straightforward to compute using a computer. To illustrate the process, as with the single-element tallies, all possible pairs across categories are first identified, so that with the example above, considering $C_1$ and $C_2$ yields:

TABLE 1

|  | Red | Yellow | Orange | Green |
|---|---|---|---|---|
| Apple | 2 | 1 | 0 | 1 |
| Orange | 0 | 0 | 3 | 0 |
| Banana | 0 | 2 | 0 | 1 | and

TABLE 2

|  | Apple | Orange | Banana |
|---|---|---|---|
| Red | 2 | 0 | 0 |
| Yellow | 1 | 0 | 2 |
| Orange | 0 | 3 | 0 |
| Green | 1 | 0 | 1 | where the tables are read by looking at the element in the first column as a given and then reading across to determine the tally of the total number of times the element in the other column appears given that the element in the first column is chosen. For example, given that an "apple" is chosen, there are 2 instances of "red," 1 instance of "yellow," and 1 instance of "green." Note that the tally is computed in both directions from $C_1$ to $C_2$ and from $C_2$ to $C_1$. A similar tally would be conducted for all pairs of categories, or at least as many pairs as the user is interested in including for consideration.

Any particular possible clustering can be assessed based on the frequency of occurrence of these pairs in a manner similar to the assessment derived from the frequency of occurrence of single elements. For the assignment of:

Cluster 1={Data #1, Data #2, Data #9, Data #10}

TABLE 3

|  | Red | Yellow | Orange | Green |
|---|---|---|---|---|
| Apple | 2 | 1 | 0 | 1 |
| Orange | 0 | 0 | 0 | 0 |
| Banana | 0 | 0 | 0 | 0 | and

TABLE 4

|  | Apple | Orange | Banana |
|---|---|---|---|
| Red | 2 | 0 | 0 |
| Yellow | 1 | 0 | 0 |
| Orange | 0 | 0 | 0 |
| Green | 1 | 0 | 0 |

Cluster 2={Data #3, Data #4, Data #5}

TABLE 5

|  | Red | Yellow | Orange | Green |
|---|---|---|---|---|
| Apple | 0 | 0 | 0 | 0 |
| Orange | 0 | 0 | 3 | 0 |
| Banana | 0 | 0 | 0 | 0 | and

TABLE 6

|  | Apple | Orange | Banana |
|---|---|---|---|
| Red | 0 | 0 | 0 |
| Yellow | 0 | 0 | 0 |
| Orange | 0 | 3 | 0 |
| Green | 0 | 0 | 0 |

Cluster 3={Data #6, Data #7, Data #8}

TABLE 7

|  | Red | Yellow | Orange | Green |
|---|---|---|---|---|
| Apple | 0 | 0 | 0 | 0 |
| Orange | 0 | 0 | 0 | 0 |
| Banana | 0 | 2 | 0 | 1 | and

TABLE 8

|  | Apple | Orange | Banana |
|---|---|---|---|
| Red | 0 | 0 | 0 |
| Yellow | 0 | 0 | 2 |
| Orange | 0 | 0 | 0 |
| Green | 0 | 0 | 1 |

The ratios of the observed frequencies in these three tables to the total tally are then computed as:

(Ratio) Cluster 1={Data #1, Data #2, Data #9, Data #10}

TABLE 9

|  | Red | Yellow | Orange | Green |
|---|---|---|---|---|
| Apple | 2/2 | 1/1 | 0 | 1/1 |
| Orange | 0 | 0 | 0 | 0 |
| Banana | 0 | 0 | 0 | 0 | and

TABLE 10

|  | Apple | Orange | Banana |
|---|---|---|---|
| Red | 2/2 | 0 | 0 |
| Yellow | 1/1 | 0 | 0/2 |
| Orange | 0 | 0 | 0 |
| Green | 1/1 | 0 | 0/1 |

(Ratio) Cluster 2={Data #3, Data #4, Data #5}

TABLE 11

|  | Red | Yellow | Orange | Green |
|---|---|---|---|---|
| Apple | 0/2 | 0/1 | 0 | 0/1 |
| Orange | 0 | 0 | 3/3 | 0 |
| Banana | 0 | 0/2 | 0 | 0/1 | and

TABLE 12

|  | Apple | Orange | Banana |
|---|---|---|---|
| Red | 0/2 | 0 | 0 |
| Yellow | 0/1 | 0 | 0/2 |
| Orange | 0 | 3/3 | 0 |
| Green | 0/1 | 0 | 0/1 |

(Ratio) Cluster 3={Data #6, Data #7, Data #8}

TABLE 13

|  | Red | Yellow | Orange | Green |
|---|---|---|---|---|
| Apple | 0/2 | 0/1 | 0 | 0/1 |
| Orange | 0 | 0 | 0/3 | 0 |
| Banana | 0 | 2/2 | 0 | 1/1 | and

TABLE 14

|  | Apple | Orange | Banana |
|---|---|---|---|
| Red | 0/2 | 0 | 0 |
| Yellow | 0/1 | 0 | 2/2 |
| Orange | 0 | 0/3 | 0 |
| Green | 0/1 | 0 | 1/1 |

All paired squared differences between each element in each corresponding table for $C_1$ and $C_2$, $C_2$ and $C_3$, and $C_3$ and $C_1$ can be computed and summed, and then added to the total computed based on single-element considerations as before to arrive at a new measure that scores the merit of the proposed clustering including the relationships between the elements of the considered categories. In general, the mathematical function of merit is computed by taking the sum for each element (ele) in each category (cat):

$$\Sigma(i=1,\ldots,N_C-1)\Sigma(j=i+1,\ldots,N_C)\Sigma(\text{ele})(e=1,\ldots,n(\text{ele,cat}))(f_i(e)-f_j(e))^2$$

where $N_C$ is the number of clusters, i is an index that runs from 1 to one less than the total number of clusters, j is an index that runs from i+1 to the number of clusters, ele is an element in cat, Σ(ele) indicates the element being considered in the summation, n(ele, cat) is the number of distinct elements ele in the category cat, e is an index running from 1 to the number n(ele, cat), and $f_i(e)$ and $f_j(e)$ are the fractions of the element with index e that occur in cluster i and cluster j, where the fraction is computed as a ratio of the number of instances of the element in the cluster in question to the total number of instances of the element.

This scoring method can be extended to include higher-order relationships, such as the frequencies of occurrence of an element given two other elements (A|B, C), where the vertical line means "given," the frequencies of occurrence of two elements given a third element (B, C|A), and so forth (e.g., A|B, C, D). The effects of single-element frequencies versus those of pairs or higher-order combinations can be weighted as desired:

$$\alpha_1 \times \Sigma(i=1,\ldots,N_C-1)\Sigma(j=i+1,\ldots,N_C)\Sigma(\text{ele})(e=1,\ldots,n(\text{ele,cat}))(f_i(e)-f_j(e))^2$$

$$+$$

$$\alpha_2 \times \Sigma(i=1,\ldots,N_C-1)\Sigma(j=i+1,\ldots,N_C)\Sigma(\text{ele}_1,\text{ele}_2)(e_1=1,\ldots,n(\text{ele}_1,\text{cat}_1),e_2=1,\ldots,n(\text{ele}_2,\text{cat}_2))(f_i(e_1|e_2)-f_j(e_1|e_2))^2$$

$$+\ldots$$

where sums are taken over all pairs of elements from every category, in both directions (e.g., A|B and B|A), and $\alpha_1$, $\alpha_2$, ..., are coefficients used to amplify or reduce the effect of the contribution of the term in question. These coefficients can be chosen by user as desired. It will be clear to a skilled reader that variations of this general formalization are possible, including performing operations other than squaring differences, other than summing squared or other differences, other than weighting contributions from single-element frequencies, and higher-order combinations, and so forth.

Those skilled in the art of computation will note that the number of computations required to compute all frequencies for the clustering method increases at a rapid rate as a function of the number of elements in each category. When considering all possible pairs of elements, the total number of frequencies to be calculated is twice the product of the number of elements in each category, $(2 \times n_1 \times n_2 \times \ldots \times n_k$, where there are k categories, and $n_i$ is the number of elements in each category i, i=1, ..., k). The factor of two occurs because the relationships occur in both directions (e.g., A|B and B|A). The number of frequencies to calculate when considering triples or higher-order combinations of elements many be computationally prohibitive for some computers, even at some limit supercomputers. Thus, a skilled person may seek to include only those single-, paired-, and higher-order element relationships that are deemed particularly important to the clustering problem at hand. Some relationships may be explicitly omitted (e.g., when certain relationships are known to be very infrequent and therefore of minimal effect on the overall clustering score) in order to arrive at a solution to the clustering problem with a reasonable amount of computing power.

With a well-defined mathematical function that scores alternative arrangements of data in clusters, the objective becomes to find the arrangement that maximizes the value of the function (or possibly minimizes the value or searches for some other special characteristic of some other function). This is known in mathematics and computer science as a combinatorial optimization problem, where a combination of decisions must be made to generate best effect. A computer 320 is useful in this regard. Here, the problem is to assign data to individual clusters so as to find the best value of the mathematical function 322. (Those skilled fuzzy logic will note immediately that the problem can be extended to treat the case where data can be assigned to clusters with varying degrees of membership.) This can be accomplished using a variety of methods, including random search, hilt-climbing, TABU search, simulated annealing, a diverse assortment of evolutionary algorithms, and potentially other methods as well.

One instance of an evolutionary algorithm is as follows: Data are provided for clustering. The data comprise multiple categories and have multiple types of elements in each category. A solution to the clustering problem is viewed as a complete assignment of every data record to a cluster. The number of clusters is chosen before beginning the evolutionary algorithm. The algorithm maintains a collection of solutions at any time, called a population. The population contains the best solutions found up to the given point in time. At the beginning of the execution of the evolutionary algorithm, these solutions can be created by assigning data records to clusters at random, or by using other heuristics, or hints provided by people, or other methods. The population size, which is the total number of solutions maintained at any time, may range from a minimum of one to any positive integer, limited by the memory capacity of the computational device being used. Typical population sizes may range from 100 to 10,000 solutions. Each of the initial solutions is scored to determine how well it performs the desired clustering. The performance measure can be the one described above, or another reasonable alternative that assesses the degree to which data clustered together are similar and data assigned to alternative clusters are disparate. Once each solution is scored, new solutions are created from these solutions. One method for creating these new solutions is to use each existing solution in turn as the basis for creating a new solution, thereby doubling the number of solutions that may be considered. The new solutions created from the existing solutions are termed offspring, whereas the existing solutions are termed parents. The offspring can be created by changing the parents, typically using stochastic methods. For example, a parent may create an offspring by a process of selecting a data record at random and changing the assignment of its cluster to a different cluster. This mutation rule could be applied multiple times to a single parent in creating offspring, generating a degree of variation between the parent and its offspring. Other mutation rules could be used, which may involve varying the probability of selecting data records for changing their assigned cluster, using scoring information to guide the choice of selecting data records for changing their assigned cluster, as well as the use of two or more existing parent solutions in creating an offspring, such as by taking the first half of data record assignments from one parent and then the second half of data record assignments from the second parent, or by choosing randomly as to which parent solution to refer to for each data record and then copying the cluster assignment for the data record as chosen at random from one of the parents. The reader skilled in evolutionary algorithms will recognize that there are many other possible methods for generating offspring solutions from parent solutions, and that the number of offspring created, and the number of offspring per parent, can be varied to different effect. The reader skilled in evolutionary algorithms will also recognize additional means for extending the methods of creating offspring from parents, including the use of self-adaptive processes to control the variation process as it proceeds, and probabilistic settings for applying different variation operators. The offspring solutions are scored, which is performed nominally in the same manner as was applied to the parent solutions that created them. A selection process is then applied to determine which solutions to maintain for the creation of new solutions. The selection process can compare all the existing parents and offspring and sort them based on their scores. A number of solutions, perhaps equal to the previous number of parents, is then selected to persist, chosen typically as the best scoring solutions at that time. Readers skilled in evolutionary algorithms will note that there are many alternative forms of selection, which can vary the number of new parents selected, use probabilistic rules for selecting new solutions, discard all parents and focus attention only on the offspring, apply a maximum duration criterion to any solution, and other methods. After the process of selection, a generation is said to be complete. The process is conducted for a number of generations and halted either by the user at his or her discretion, or by rules that apply to the number of generations completed, the performance obtained by solutions in the population, the time required to execute the process, or other heuristics. The process can be examined at any point during the execution, as well as at its completion, and the best-available solution, or any other solution, can be chosen for further processing or use in subsequent applications.

Outliers, Anomalies, and Exemplars

Once a candidate assignment of data to clusters has been chosen, it may be of interest to identify outliers or anomalies in the data. An outlier may be defined as a particular data record that does not fit well within the cluster to which it has been assigned. An anomaly may be defined as a data record that does not fit well within any specified cluster. Thus the set of anomalies is a subset of the set of outliers. When treating purely numeric data, outliers and anomalies can be identified using distance measures to assess how close a particular data record is to its cluster center, and to all other cluster centers. Those data that are relatively distant from their own cluster center are regarded as outliers. Those data that are relatively distant from any cluster center are regarded as anomalies.

When treating categorical data, however, there is no convenient measure that emerges from Euclidean geometry to quantify the distance from a data record to the center of its assigned cluster. Indeed, defining the center of a cluster of categorical data is problematic itself.

Instead, some examples of the invention presented here make use of a new process for determining outliers and anomalies in clustered categorical data. Suppose that all data have been assigned to clusters, following any method such as those indicated above. For each cluster, the user can consider the effect that would occur to the mathematical clustering function if each data record in turn were removed from the cluster and assigned to another cluster. For convenience, the discussion here will focus on assigning the data record to the cluster that provides the best effect on the mathematical clustering function other than the cluster to which it is assigned currently. For example, if a data record is in Cluster 1, and there are two other clusters, Cluster 2 and Cluster 3, consider the effect of removing the data record from Cluster 1 and moving it to Cluster 2, then consider the effect of removing the data record from Cluster 1 and moving it to Cluster 3. Determine which of these two effects would be better from the perspective of the mathematical clustering function and record the numeric increase or decrease in that function that would result. For convenience, consider this value to be negative if the function would return a lower (worse) score if the data record were removed. Therefore, large negative values indicate data records that are properly assigned to their present cluster. Large positive values indicate data that are improperly assigned to their present cluster, and the overall clustering would be improved if the data were assigned to another cluster (the one that generated the greatest positive result). The process of completing this calculation for every data record in every cluster yields a profile of numeric values for each cluster. Those data that are associated with positive values are considered outliers of their current cluster, and should be assigned to another cluster. Those data that are associated with values that are close to zero are considered anomalies, as they do not have any significant effect on the scoring function regardless of which cluster they are assigned to.

Analysis can be extended to define outliers as those data in the tail of the distribution of numeric scores associated with each cluster (e.g., the upper one percent of all scores). The analysis also serves to identify those data that may be designated as exemplars of clusters, which are those data associated with the largest negative values. These are the data for which the overall mathematical clustering scoring function would suffer the greatest reduction if they were assigned to another cluster.

The identification of outliers, anomalies, and exemplars 324 can be amplified by performing multiple attempts at clustering with algorithms that yield different results each time (e.g., simulated annealing, evolutionary algorithms, or hill-climbing when beginning from a random assignment of data to clusters). Just as with the earlier example of clustering fruit and colors, alternative clustering can be made in multiple clustering attempts. The designation of certain data as being outliers, anomalies, or exemplars can be given greater confidence 326 if those data are identified consistently or at least repeatedly as outliers, anomalies, or exemplars, respectively, in multiple attempts at clustering.

In a preferred embodiment, the method may be implemented on a computing device, with input/output mechanisms, graphical display, internal memory (RAM/ROM), external memory in a hard drive, and other typical elements of a computer, to display the clustering results and the detection of outliers, anomalies, and exemplars to the user. The user may also adjust the methods of clustering to explore alternative results of clustering.

CONCLUSIONS, RAMIFICATIONS, AND SCOPE

The methods of clustering categorical data and detecting outliers, anomalies, and exemplars can be applied in diverse areas. In one example, the methods may be applied to data representing credit card transactions, with the intent being to separate transactions into multiple clusters so as to afford greater possibility of discriminating valid transactions from fraudulent transactions. The use of a number of clusters that is greater than two may afford the possibility of discriminating between alternative types of valid and/or fraudulent transactions. Outliers can be detected and efforts made to determine if erroneous data are corrupting those cases. Anomalies can be detected and further investigative efforts made to identify reasons for their not belonging to any cluster. Exemplars can be identified to serve as prototypical examples for future comparisons to new data. In another example, the methods may be applied to clustering and detecting outliers, anomalies, and exemplars in risk-based profiling for terrorist activities in commerce or other areas based on commercial, government, and/or other data. In an example of risk-based profiling for terrorist activities pertaining to shipping containers, categories may include, for example, country of origin, nationality, container size, and container color. In another example, the methods may be applied to cluster and detect outliers, anomalies, and exemplars in medical data pertaining to diseases, genetic conditions, diagnostics, when physicians and scientists may seek a better understanding of factors that underlie medical conditions or test results, such as those found in mammograms or other screening tests. In another example, the methods for clustering and detecting outliers, anomalies, and exemplars may be applied to census data or responses to questionnaires to identify similarities and differences between groups of people in terms of their personal statistics and responses to questions.

C. Overall Sequence of Operation

First Sequence

For ease of explanation, but without any intended limitation, exemplary method aspects of the invention are described with reference to the computing system 100 described above and shown in FIG. 1. An example of a method aspect of the invention is illustrated in FIGS. 4A, 4B, 4C, 4D, and 4E, which show a sequence 400 for a method for assigning categorical data to a plurality of clusters.

Figure 4A:
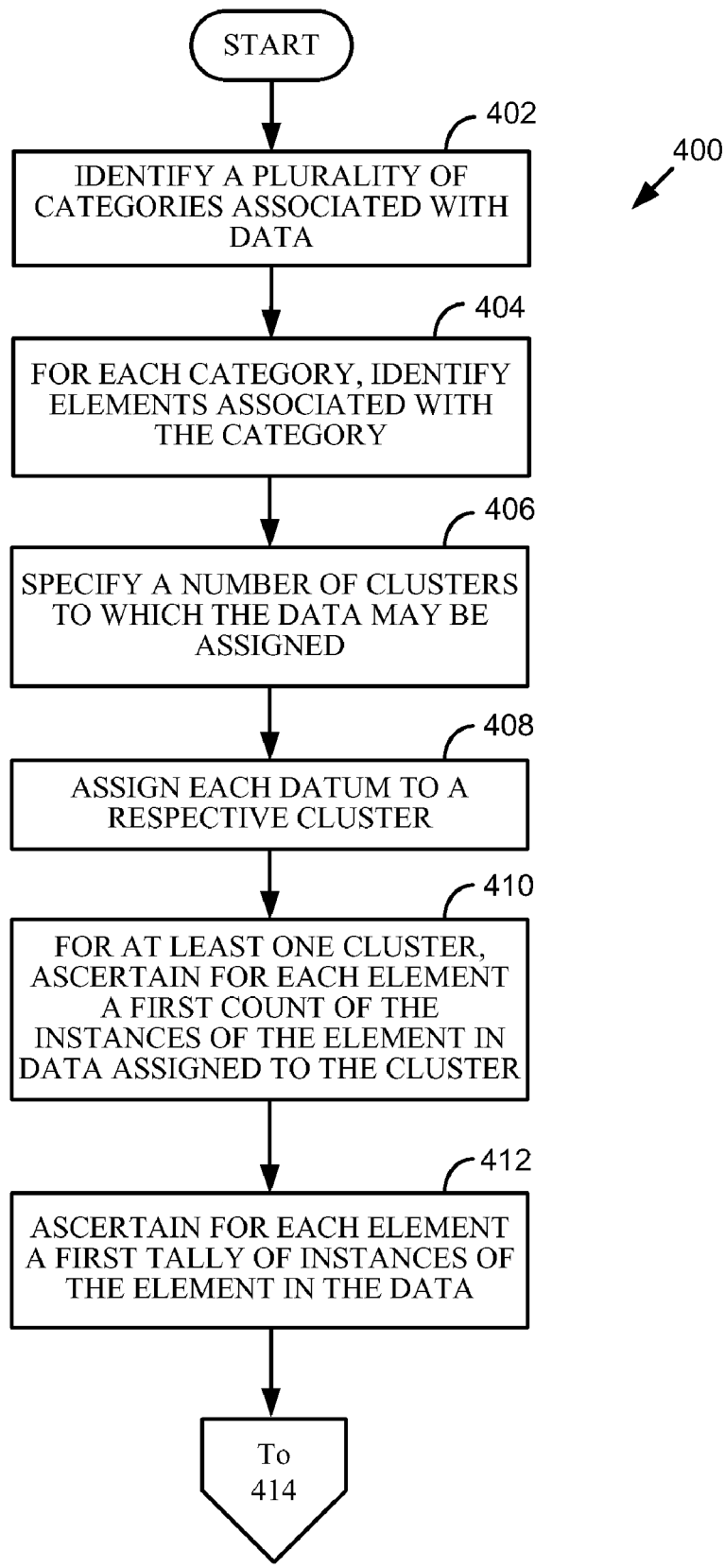
FIGS. 4A, 4B, 4C, 4D, and 4E are a flowchart of an operational sequence for assigning categorical data to a plurality of clusters in accordance with an example of the invention.

As an example, operations of the sequence 400 (or portions of the sequence 400) may be performed by computing system 100. Referring to FIG. 4A, sequence 400 may include, and may begin with, operation 402. Operation 402 comprises identifying a plurality of categories associated with the data. In some examples the categorical data may be described in terms of fuzzy membership functions.

Sequence 400 may also include operation 404, which comprises for each category in the plurality of categories, identifying at least one element (or elements) associated with the category. Sequence 400 may also include operation 406, which comprises specifying a number of clusters to which the data may be assigned. Sequence 400 may also include operation 408, which comprises assigning at least some of the data (or all of the data), wherein each assigned datum is assigned to a respective one of the clusters.

Sequence 400 may also include operation 410, which comprises, for at least one of the clusters, determining, for at least one category, the frequency in data assigned to the cluster of at least one element associated with the category. In some examples operation 410 may comprise ascertaining a first count, for at least one category (or for each of a plurality of categories), for at least one element associated with the category, of instances of the element in the data assigned to the cluster. In some examples the plurality of categories includes each category, and the at least one element associated with the category includes each element associated with the category. Sequence 400 may also include operation 412, which comprises, for each of a plurality of categories, for at least one element associated with the category, ascertaining a first tally of instances of the element in the data. With regard to operation 412, in some examples the plurality of categories includes each category, and the at least one element associated with the category includes each element associated with the category. In some examples the first count and/or the first tally are ascertained using only a portion of the data, wherein the portion of the data used is selected based on the number of instances of elements in respective categories. In some examples a portion of the data is excluded when ascertaining the first count and/or the first tally, wherein the portion of the data that is excluded is selected based on the number of instances of elements in respective categories.

Figure 4B:
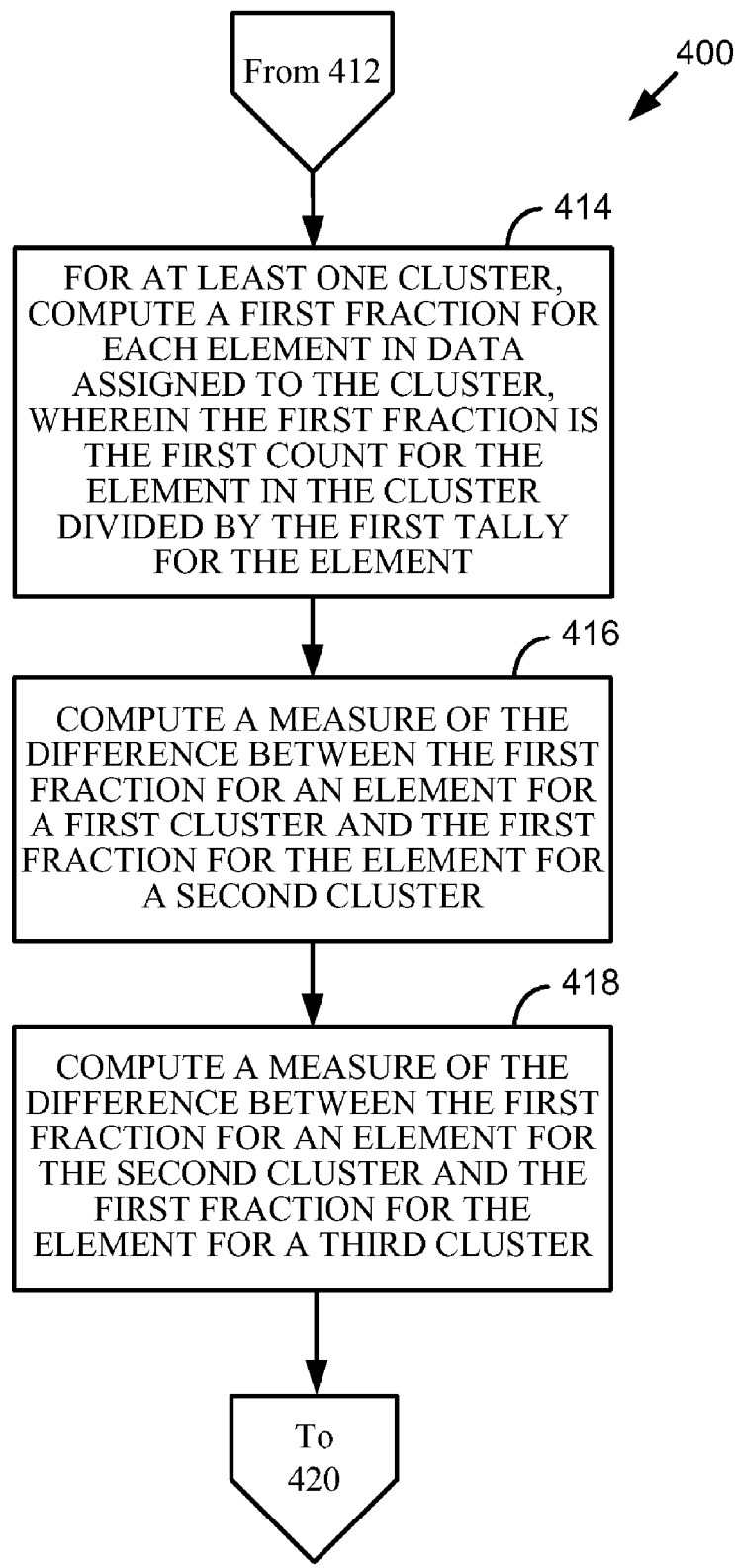

Referring to FIG. 4B, Sequence 400 may also include operation 414, which comprises for at least one cluster, computing a first fraction for at least one element (or for each element assigned to the cluster), wherein the first fraction is the first count for the element in the cluster divided by the first tally for the element. In some examples, the at least one of the clusters includes a first cluster, and operation 414 may be described as ascertaining a measure of similarity of data assigned to the first cluster, wherein the measure of similarity is a function, for at least one element, of the frequency in data assigned to the first cluster of the element.

Sequence 400 may also include operation 416, which comprises for at least one element, computing a measure of the difference between the first fraction for the element corresponding with a first cluster and the first fraction for the element corresponding with a second cluster. In some examples, the operations of computing a first fraction and a measure of the difference are performed for each of a plurality of categories, for each element associated with the respective category. In some examples, operation 416 comprises, for at least one element (and in some examples for each element), subtracting the first fraction for the element computed for a first cluster, from the first fraction for the element computed for a second cluster to ascertain a first cluster-second cluster difference for the element. In some examples, the measure of the difference is a squared difference between the fraction for the element corresponding with the first cluster and the fraction for the element corresponding with the second cluster. In some other examples, the measure of the difference is a weighted squared difference between the fraction for the element corresponding with the first cluster and the fraction for the element corresponding with the second cluster. In some examples, the at least one of the clusters includes a first cluster and a second cluster, and operation 416 may be described as ascertaining a measure of dissimilarity between data assigned to the first cluster and data assigned to the second cluster, wherein the measure of dissimilarity is a function, for at least one element, of the frequency of the element in the data assigned to the first cluster, and the frequency of the element in the data assigned to the second cluster.

Sequence 400 may also include operation 418, which comprises for at least one element, computing a measure of the difference between the first fraction for the element corresponding with the second cluster and the first fraction for the element corresponding with a third cluster. In some examples, operation 418 may comprise, for at least one element, subtracting the first fraction for the element computed for the second cluster, from the first fraction for the element computed for a third cluster to ascertain a second cluster-third cluster difference for the element. In some other examples, operation 418 may comprise squaring each ascertained second cluster-third cluster difference.

Figure 4C:
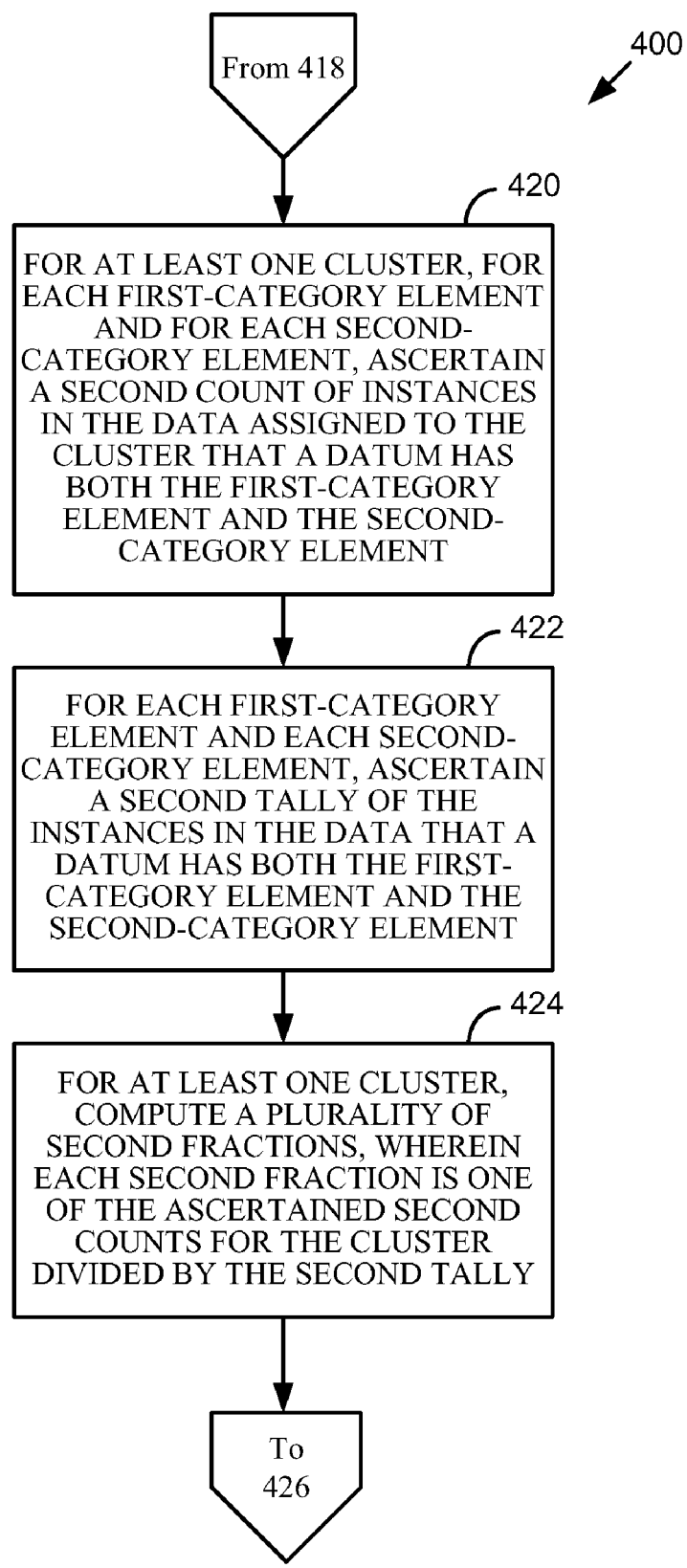
Figure 4D:
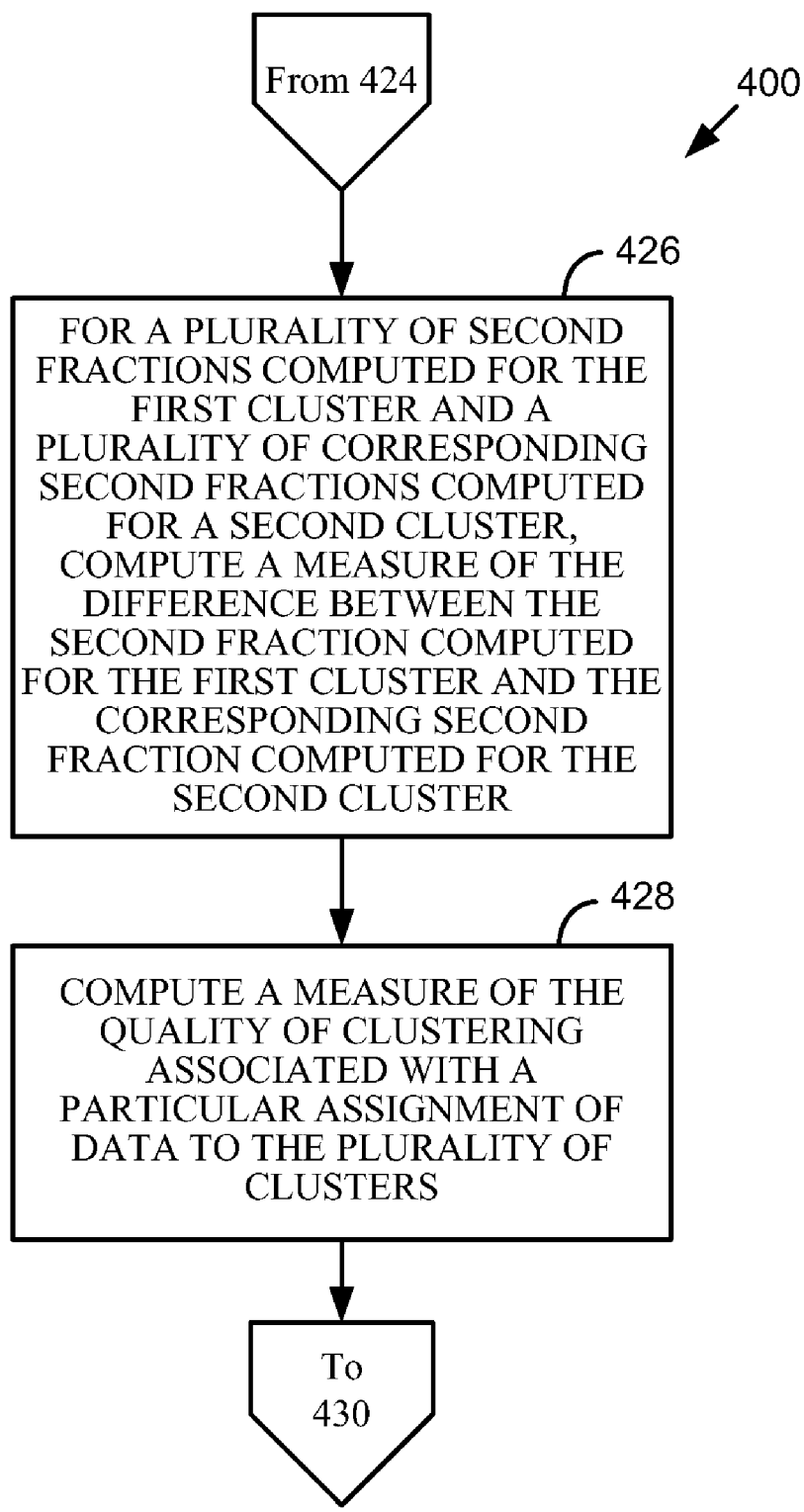

Referring to FIG. 4C, sequence 400 may also include operation 420. Elements associated with a first category may be called first-category elements and elements associated with a second category may be called second-category elements. Operation 420 may comprise, for each of a plurality of clusters (or for at least one cluster), for each first category element, and for each second category element, (or for a subset of first-category elements and second-category elements), ascertaining a second count of instances in the data assigned to the cluster that a datum has both the first-category element and the second-category element.

Similarly, some examples may include, for at least one of the clusters, determining the frequency in data assigned to the cluster of datum having a first specified element associated with a first category and a second specified element associated with a second category and a third specified element associated with a third category. Elements associated with a third category may be called third-category elements. Accordingly, in some examples operation 420 may comprise for each of a plurality of clusters, for each first category element, and for each second category element, and for each third category element, ascertaining a third count of instances in the data assigned to the cluster that a datum has both the first-category element and the second-category element and the third-category element.

Sequence 400 may also include operation 422, which comprises, for each first category element, and for each second category element, (or for a subset of first-category elements and second-category elements), ascertaining a second tally of the instances in the data that a datum has both the first-category element and the second-category element. In some examples the second count and/or the second tally are ascertained using only a portion of the data, wherein the portion of the data used is selected based on the number of instances of combinations of elements in respective categories. In some examples, a portion of the data is excluded when ascertaining the second count and/or the second tally, wherein the portion of the data that is excluded is selected based on the number of instances of combinations of elements in respective categories. In some examples, operation 422 may comprise for each first category element, and for each second category element, and for each third category element, ascertaining a third tally of the instances in the data that a datum has the first-category element and the second-category element and the third-category element.

Sequence 400 may also include operation 424, which comprises for each of the plurality of clusters (or for at least one cluster), computing a plurality of second fractions, wherein each second fraction is one of the ascertained second counts for the cluster divided by the second tally. In some examples operation 424 may comprise, for at least one of the clusters, determining the frequency in data assigned to the cluster of datum having both a first specified element associated with a first category and a second specified element associated with a second category. In some examples, operation 424 may comprise ascertaining a measure of similarity of data assigned to a first cluster, wherein the measure of similarity is a function of the frequency in data assigned to the first cluster of datum having both a first specified element associated with a first category and a second specified element associated with a second category. In some examples, operation 424 may comprise, for each of the plurality of clusters, computing a plurality of third fractions, wherein each third fraction is one of the ascertained third counts for the cluster divided by the third tally Referring to FIG. 4D, sequence 400 may also include operation 426, which comprises, for a plurality of second fractions computed for the first cluster, and a plurality of corresponding second fractions computed for a second cluster, computing a measure of the difference between the second fraction computed for the first cluster and the corresponding second fraction computed for the second cluster. Corresponding second fractions are fractions that are computed for a same first-category element and a same second-category element. In some examples, operation 426 may comprise ascertaining a measure of dissimilarity between data assigned to a first cluster and data assigned to a second cluster, wherein the measure of dissimilarity is a function of the frequency in data assigned to the first cluster, and of the frequency in data assigned to the second cluster, of datum having both a first specified element associated with a first category and a second specified element associated with a second category. Operation 426 may also comprise, for a plurality of second fractions computed for the second cluster and a plurality of corresponding second fractions computed for a third cluster, computing a measure of the difference between the second fraction computed for the second cluster and the corresponding second fraction computed for the third cluster, wherein corresponding second fractions are computed for a same first-category element and a same second-category element. In some examples, operation 426 may comprise, for a plurality of third fractions computed for a first cluster and a plurality of corresponding third fractions computed for a second cluster, computing a measure of the difference between a third fraction computed for the first cluster and the corresponding third fraction computed for the second cluster, wherein corresponding third fractions are computed for a same first-category element and a same second-category element and a same third-category element.

Sequence 400 may also include operation 428, which comprises computing (or calculating) a measure of the quality of clustering. The measure of the quality of clustering may be computed using a measure of the difference between first fractions, and/or a measure of the difference between second fractions (and/or third fractions). In some examples the measure of the quality of clustering may be associated with a particular assignment of data to the plurality of clusters, wherein the measure of the quality is a function, for at least one category, for at least one element associated with the category, of the frequency of the element in the assigned data. In some examples operation 428 may comprise computing a first measure of quality of clustering corresponding with a particular assignment of data to clusters, wherein the first measure of quality is a function of the difference between the first fractions computed for corresponding elements in different clusters. In some examples operation 428 may comprise adding together each first cluster-second cluster difference to form a sum representing a first measure of the quality of clustering associated with a particular assignment of data to clusters. In some examples operation 428 may comprise multiplying together each first cluster-second cluster difference to form a product representing a first measure of the quality of clustering associated with a particular assignment of data to clusters. In other examples, operation 428 may comprise squaring each ascertained first cluster-second cluster difference, and adding together each squared ascertained first cluster-second cluster difference to form a sum representing a first measure of quality of the clustering associated with a particular assignment of data to clusters. In some examples, operation 428 may comprise squaring each ascertained second cluster-third cluster difference, and adding together each squared ascertained second cluster-third cluster difference to form a sum representing a second measure of quality of the clustering. Some examples may further comprise adding the first measure of quality of the clustering to the second measure of quality of the clustering to form a sum representing a third measure of quality of the clustering.

With regard to the measure of the difference between second fractions, operation 428 may comprise adding together each measure of the difference between second fractions to form a sum representing a measure of the quality of clustering associated with a particular assignment of data to clusters. In some examples each measure of the difference (of second fractions) is multiplied together to form a product representing a measure of the quality of clustering associated with a particular assignment of data to clusters. In some examples each measure of the difference (of second fractions) is a squared difference between corresponding second fractions. In some examples the measure of the difference (of second fractions) is a weighted squared difference between corresponding second fractions. In some examples, each measure of the difference between second fractions associated with the first cluster and second fractions associated with the second cluster, and between second fractions associated with the second cluster and second fractions associated with the third cluster, is added (or multiplied) together to form a sum (or product) representing a measure of the quality of clustering associated with a particular assignment of data to clusters. Further, in some examples, operation 428 may comprise calculating a measure of the quality of clustering, wherein the measure of the quality of clustering is a function of each computed measure of the difference between the third fraction computed for the first cluster and the corresponding third fraction computed for the second cluster.

Figure 4E:
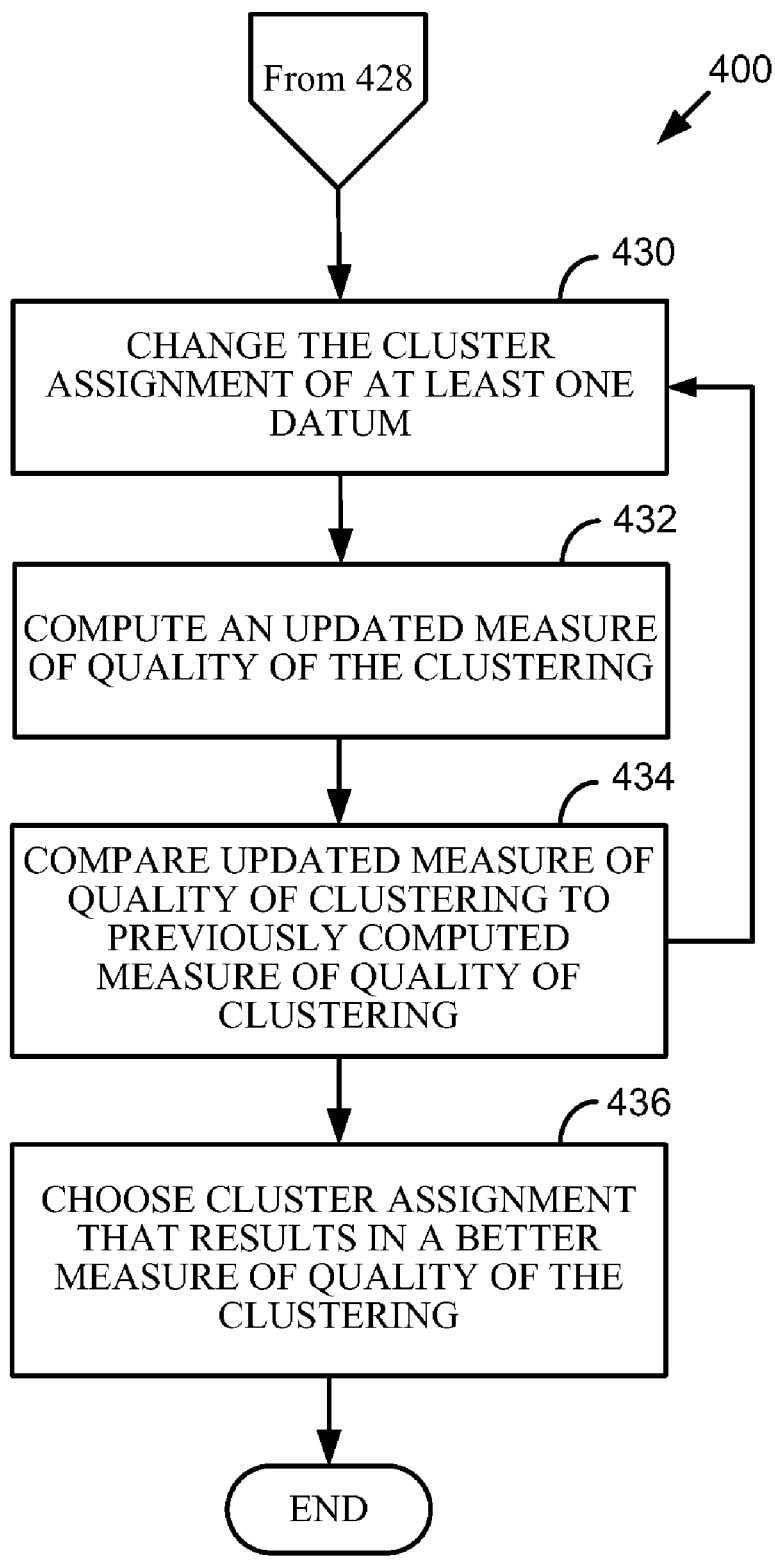

Referring to FIG. 4E, sequence 400 may also include operation 430, which comprises changing the cluster assignment of at least one datum to a different cluster (to an alternative cluster), which may be described as removing the at least one datum from the first cluster. Some examples comprise iteratively adjusting the cluster assignment of at least one datum to a different cluster to improve the measure of quality of the clustering, using an evolutionary algorithm. In some examples, the iterative adjustment may be performed using simulated annealing. In some examples, the iterative adjustment may be performed using a TABU search. In some examples, the iterative adjustment may be performed using hill-climbing. In some examples, the iterative adjustment may be performed using other meta-heuristics. In some examples, the iterative adjustment may be performed using meta-heuristics.

Sequence 400 may also include operation 432, which comprises computing an updated measure of quality of the clustering. Sequence 400 may also include operation 434, which comprises comparing the updated measure of quality of the clustering to a measure of quality of the clustering previously computed (for example, an initial measure of quality of clustering). In some examples, operations 430, 432, and 434 may be repeated one or more times. Sequence 400 may also include operation 436, which comprises choosing a cluster assignment that results in a better measure of quality of the clustering, which, for example, may be a cluster assignment that results in the largest number for the measure of quality of the clustering (or in alternative embodiments may be a cluster assignment that results in the smallest number).

Second Sequence

Figure 5A:
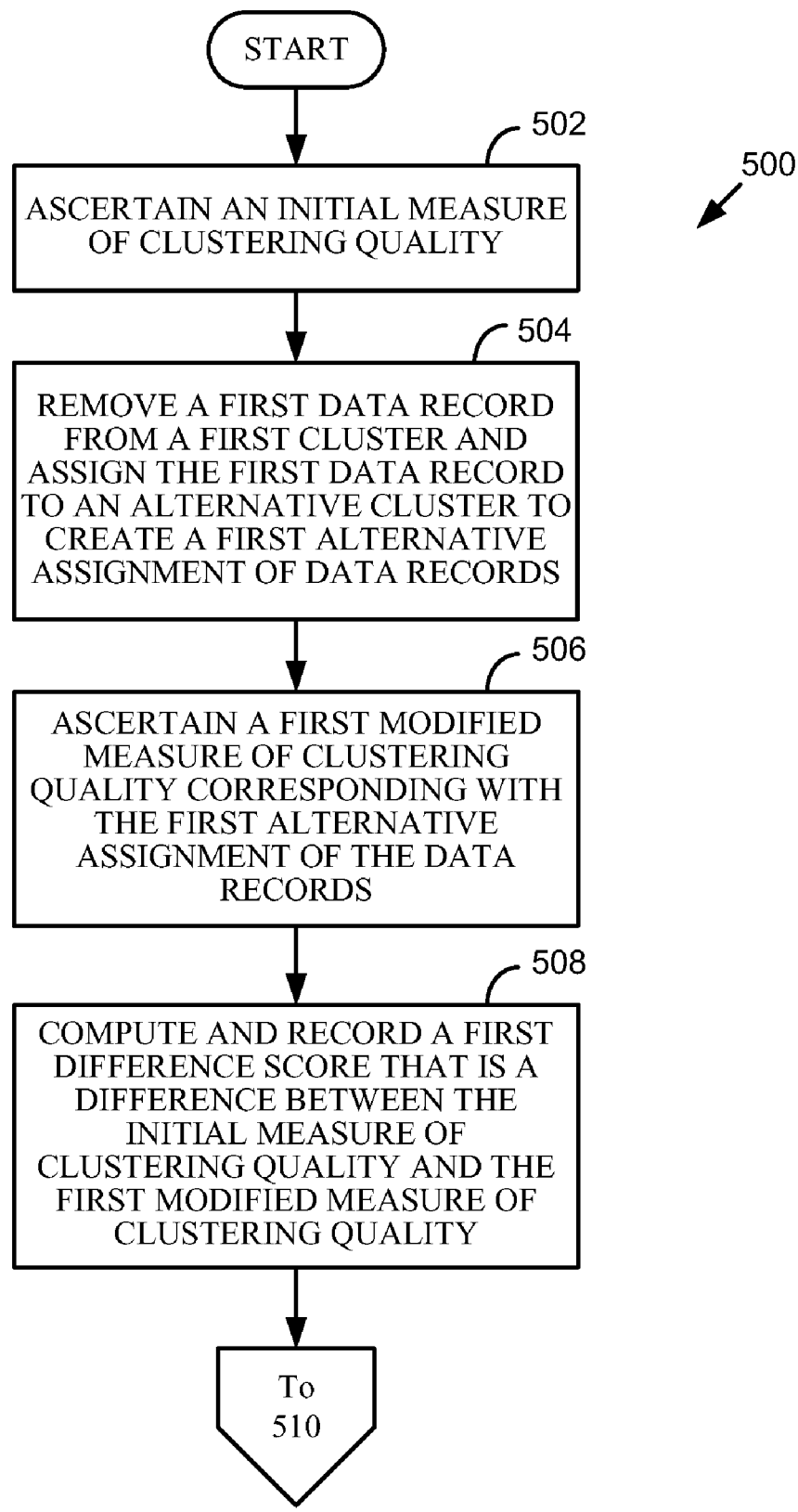
FIGS. 5A, 5B, and 5C are a flowchart of an operational sequence for detecting outliers, anomalies, and exemplars in clustered categorical data in accordance with an example of the invention.
Figure 5B:
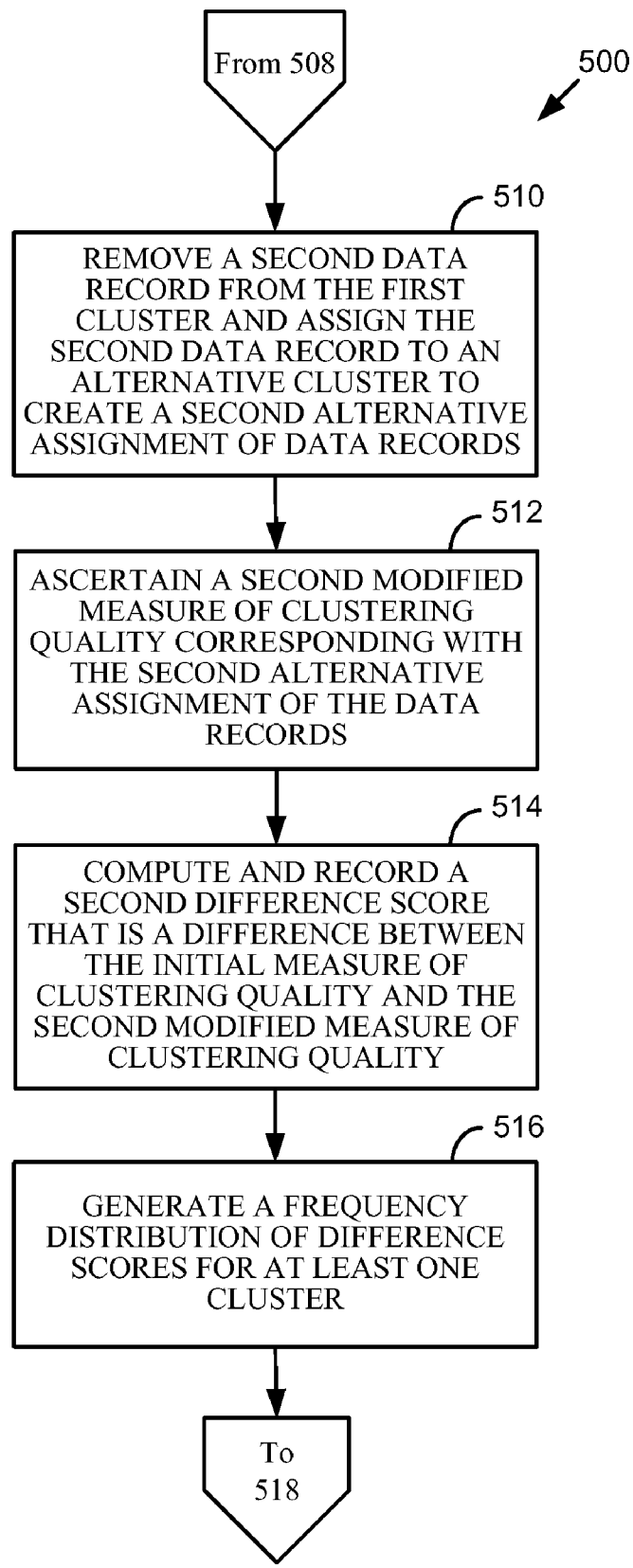
Figure 5C:
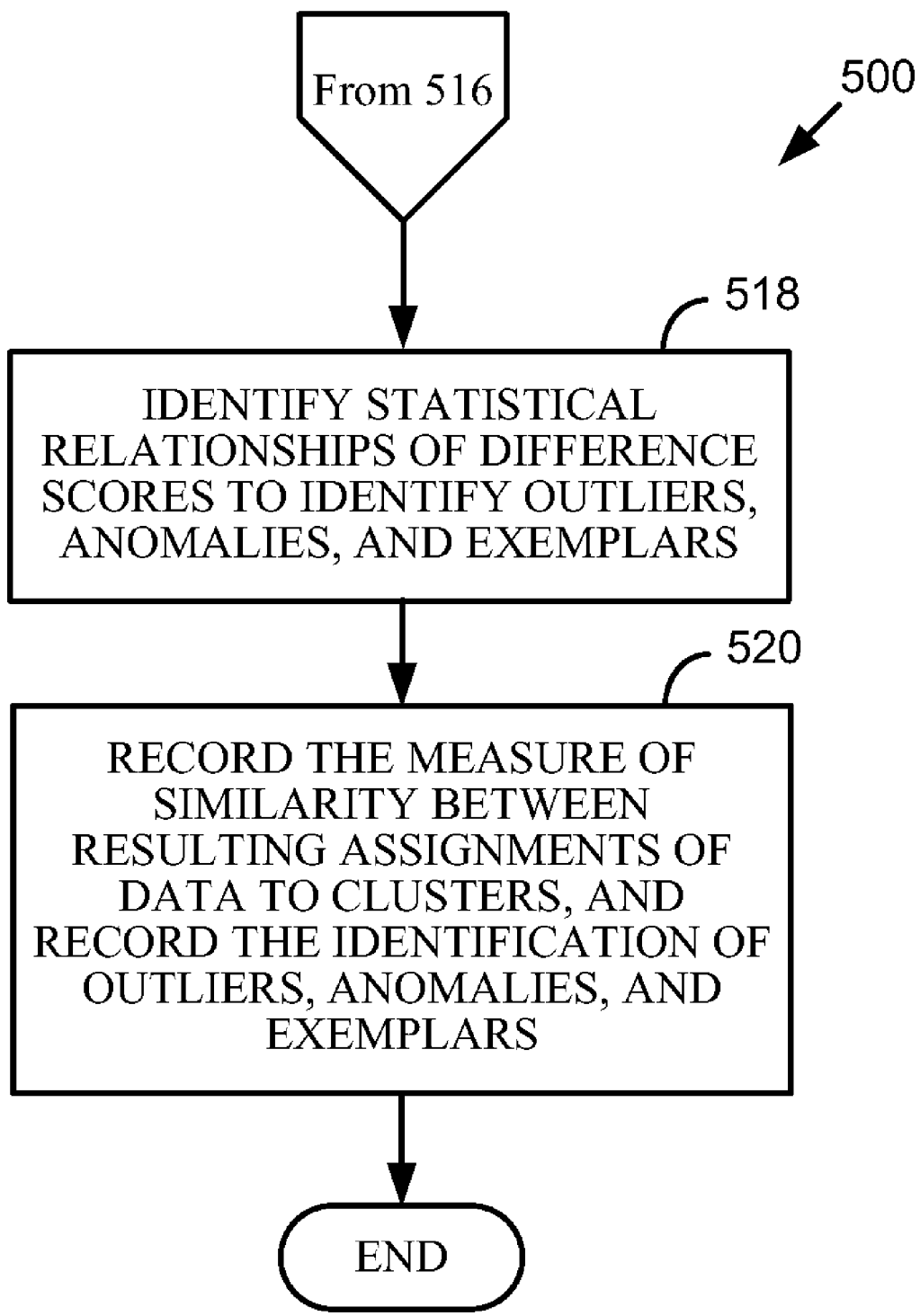

An example of another method aspect of the invention is illustrated in FIGS. 5A, 5B, and 5C, which show a sequence 500 for a method for detecting outliers, anomalies, and exemplars in clustered categorical data. Some or all of sequence 500 may be performed with some or all of sequence 400, discussed above. As an example, operations of the sequence 500 (or portions of the sequence 500) may be performed by computing system 100.

Referring to FIG. 5A, sequence 500 may include, and may begin with, operation 502. Operation 502 comprises ascertaining an initial measure of clustering quality (quality of clustering) corresponding with an assignment of data records to clusters. Sequence 500 may also include operation 504, which comprises removing a first data record that has been initially assigned to a first cluster from the first cluster, and assigning the first data record to an alternative cluster, to create a first alternative assignment of the data records. The alternative cluster may be a cluster determined to provide the best effect in the first modified measure of clustering quality in comparison to other clusters. Sequence 500 may also include operation 506, which comprises ascertaining a first modified measure of clustering quality (also called a first alternative measure of clustering quality) corresponding with the first alternative assignment of the data records. Sequence 500 may also include operation 508, which comprises computing and recording a first difference score, wherein the difference score is a difference between the initial measure of clustering quality and the first modified measure of clustering quality.

Referring to FIG. 5B, sequence 500 may include operation 510, which comprises removing a second data record that has been initially assigned to the first cluster from the first cluster, and assigning the second data record to an alternative cluster, to create a second alternative assignment of the data records. Sequence 500 may also include operation 512, which comprises ascertaining a second modified measure of clustering quality corresponding with the second alternative assignment of the data records. Sequence 500 may also include operation 514, which comprises computing and recording a second difference score, wherein the difference score is a difference between the initial measure of clustering quality and the second modified measure of clustering quality. Sequence 500 may also include operation 516, which comprises for at least one cluster, generating a frequency distribution of difference scores for corresponding data records that were initially assigned to the cluster.

Referring to FIG. 5C, sequence 500 may include operation 518, which comprises identifying statistical relationships of difference scores to identify outliers, anomalies, and/or exemplars. In some examples the first data record may be identified as an outlier if the measure of clustering quality is improved when the first data record is assigned to the alternative cluster. In some examples the first data record is identified as an exemplar if the measure of clustering quality is significantly reduced when the data record is assigned to the alternative cluster. In some examples the first data record is identified as an anomaly if the measure of clustering quality is not substantially improved and is not substantially degraded when the first data record is assigned to the alternative cluster. In some examples the first data record may be identified as an anomaly if a specified percentage of other data records have a greater effect on the measure of clustering quality than the first data record, when the other data records are assigned to one or more respective alternative clusters. In some examples the first data record may be identified as an exemplar if the measure of clustering quality is significantly reduced when the data record is assigned to the alternative cluster. As an example, ascertaining whether the measure of clustering is significantly reduced may be determined by ascertaining whether a specified percentage of other data records have less effect on the measure of clustering than the first data record, if the other data records are assigned to one or more respective alternative clusters. In some examples the first data record may be identified as an exemplar if the measure of clustering is significantly reduced when the first data record is assigned to the alternative cluster, wherein significance is determined by the percentage of other data records that have less effect on the measure of clustering than the first data record, when the other data records are assigned to one or more respective alternative clusters. In some examples, the amount of confidence accorded to the identification of a data record as an outlier, anomaly, or exemplar may be a function of the consistency in which the data record is identified as a respective outlier, anomaly, or exemplar when the data record is assigned to different alternative clusters.

Sequence 500 may also include operation 520, which comprises recording the measure of similarity (also called the degree of similarity) of data assignments to clusters and the identification of outliers, anomalies, and exemplars. The recorded information may be used to amplify or reduce the degree to which data records are identified as outliers, anomalies, and/or exemplars.

D. Examples of Some Aspects of the Invention

The following are examples of some aspects of the invention:

Example 1

A method to determine clusters within categorical data comprising the steps:
i) Identifying the categories of data
ii) Identifying the elements of the categories
iii) Choosing the number of clusters to which to assign the data
iv) Assigning data to clusters
v) Utilizing the frequency of elements in categories of data to determine the degree of similarity of data assigned to a cluster
vi) Utilizing the frequency of elements in categories of data to determine the degree of dissimilarity of data assigned to different clusters
vii) Utilizing the frequency of pairs and/or higher-order combinations of elements in different categories of data to determine the degree of similarity of data assigned to a cluster
viii) Utilizing the frequency of pairs and/or higher-order combinations of elements in different categories of data to determine the degree of dissimilarity of data assigned to different clusters
ix) Computing an overall measure of the quality of clustering associated with a particular assignment of data to clusters
x) Iteratively adjusting the assignment of data to clusters to improve the overall measure of quality of clustering Example 2

The method of Example 1 in which the frequency of elements in categories of data is used to determine the degree of similarity and dissimilarity of data assigned to a cluster using a method comprising the steps:
  i) Tallying the total number of instances of each element in each category
  ii) Computing the fraction of instances of each element in each category found in each cluster
  iii) Computing a measure of the difference in fractions of elements in each category across each pair of clusters Example 3

The method of Example 2 in which the measure of the difference in fraction of elements in each category across each pair of clusters is the squared difference.

Example 4

The method of Example 2 in which the measure of the difference in fraction of elements in each category across each pair of clusters is a weighted squared difference.

Example 5

The method of Example 1 in which the frequency of pairs and/or higher-order combinations of elements in different categories of data is used to determine the degree of similarity and dissimilarity of data assigned to a cluster using a method comprising the steps:
  i) Tallying the total number of instances of each pair and/or higher-order combination of elements across categories
  ii) Computing the fraction of instances of each pair and/or higher-order combination of elements across categories found in each cluster
  iii) Computing a measure of the difference in fractions of pairs and/or higher-order combinations of elements across categories across each pair of clusters Example 6

The method of Example 5 in which the measure of the difference in fraction of pairs and/or higher-order combinations of elements across categories across each pair of clusters is the squared difference.

Example 7

The method of Example 5 in which the measure of the difference in fraction of pairs and/or higher-order combinations of elements across categories across each pair of clusters is a weighted squared difference.

Example 8

The method of Example 1 in which the overall measure of the quality of clustering associated with a particular assignment of data to clusters is the sum of the other individual measures of differences.

Example 9

The method of Example 1 in which the overall measure of the quality of clustering associated with a particular assignment of data to clusters is the product of the other individual measures of differences.

Example 10

The method of Example 1 in which the iterative adjustment of the assignment of data to clusters to improve the overall measure of clustering is performed using an evolutionary algorithm.

Example 11

The method of Example 1 in which the iterative adjustment of the assignment of data to clusters to improve the overall measure of clustering is performed using simulated annealing.

Example 12

The method of Example 1 in which the iterative adjustment of the assignment of data to clusters to improve the overall measure of clustering is performed using TABU search.

Example 13

The method of Example 1 in which the iterative adjustment of the assignment of data to clusters to improve the overall measure of clustering is performed using hill-climbing.

Example 14

The method of Example 1 in which the iterative adjustment of the assignment of data to clusters to improve the overall measure of clustering is performed using meta-heuristics.

Example 15

The method of Example 1 in which the iterative adjustment of the assignment of data to clusters to improve the overall measure of clustering is performed using combinations of meta-heuristics.

Example 16

The method of Example 1 in which consideration is given to the frequencies of elements in categories and/or frequencies of pairs and/or higher-order combinations of elements across categories and only a portion of the data are included to comprise those single-, paired-, and higher-order element relationships based on the number of instances or other measures of pertinence to clustering.

Example 17

The method of Example 1 in which consideration is given to the frequencies of elements in categories and/or frequencies of pairs and/or higher-order combinations of elements across categories and a portion of the data are excluded based on the number of instances or other measures of pertinence to clustering.

Example 18

The method of Example 1 where the categorical data are described in terms of fuzzy membership functions.

Example 19

A method for detecting outliers, anomalies, and exemplars in clustered categorical data comprising the steps:
i) Identifying the overall measure of clustering for the assignment of data records to clusters
ii) Removing a data record from a cluster and assigning it to an alternative cluster that would provide the best effect on the overall measure of clustering from among the alternative clusters
iii) Recording the difference in overall measure between the clustering as first presented in step i) and the overall measure having assigned the removed data record to the best other cluster
iv) Repeating the steps ii) and iii) for data records in each cluster
v) Generating a frequency distribution of difference scores for data records in each cluster
vi) Identifying statistical relationships concerning the difference scores to assess whether or not any data record is an outlier, an anomaly, or an exemplar Example 20

The method of Example 19 in which, in step vi), data are described as being outliers when the overall measure of clustering is improved if the data were assigned to an alternative cluster.

Example 21

The method of Example 19 in which, in step vi), data are described as being anomalies when the overall measure of clustering is neither improved significantly or reduced significantly if the data were assigned to an alternative cluster.

Example 22

The method of Example 19 in which, in step vi), data are described as being exemplars when the overall measure of clustering is reduced significantly if the data were assigned to an alternative cluster.

Example 23

The method of Example 19 in which, in step vi), data are described as being anomalies based on the percentage of other data records that would have greater effect on the overall measure of clustering if any of those data were assigned to an alternative cluster.

Example 24

The method of Example 19 in which, in step vi), data are described as being exemplars when the overall measure of clustering is reduced significantly, where significance is determined by the percentage of other data records that would have less effect on the overall measure of clustering if any of those data were assigned to an alternative cluster.

Example 25

The methods of Example 1 and Example 19, in which the steps are repeated starting from alternative assignments of data to clusters, and the degree of similarity between the resulting assignments of data to clusters, and the identification of outliers, anomalies, and/or exemplars is recorded.

Example 26

The method of Example 25 in which the recording of the degree of similarity of data assignment to cluster and identification of outliers, anomalies, and/or exemplars is used to amplify or reduce the degree to which data are perceived as outliers, anomalies, and/or exemplars.

Example 27

The method of Example 26 in which greater confidence is given to data perceived as outliers, anomalies, and/or exemplars based on the consistency to which those data are identified as outliers, anomalies, and/or exemplars.

Example 28

A device for implementing the methods of Examples 1-27, consisting of a computing machine to display resulting clusters, outliers, anomalies, and exemplars to the user for interpretation and analysis, with user adjustment of the properties of the clustering method to generate alternative results III. Other Embodiments While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:
1. A non-transitory computer readable medium tangibly embodying a program of machine-readable instructions executable by a digital processing apparatus to perform operations for detecting outliers, anomalies, and exemplars in clustered categorical data, the operations comprising:
    ascertaining an initial measure of clustering quality corresponding with an assignment of data records to clusters;
    removing a first data record that has been initially assigned to a first cluster from the first cluster, and assigning the first data record to an alternative cluster, to create a first alternative assignment of the data records;
    ascertaining a first modified measure of clustering quality corresponding with the first alternative assignment of the data records;
    computing and recording a first difference score, wherein the first difference score is a difference between the initial measure of clustering quality and the first modified measure of clustering quality;
    wherein the alternative cluster is a cluster determined to provide the best effect in the first modified measure of clustering quality in comparison to other clusters.

2. A non-transitory computer readable medium tangibly embodying a program of machine-readable instructions executable by a digital processing apparatus to perform operations for detecting outliers, anomalies, and exemplars in clustered categorical data, the operations comprising:
   ascertaining an initial measure of clustering quality corresponding with an assignment of data records to clusters;
   removing a first data record that has been initially assigned to a first cluster from the first cluster, and assigning the first data record to an alternative cluster, to create a first alternative assignment of the data records;
   ascertaining a first modified measure of clustering quality corresponding with the first alternative assignment of the data records;
   computing and recording a first difference score, wherein the first difference score is a difference between the initial measure of clustering quality and the first modified measure of clustering quality;
   removing a second data record that has been initially assigned to the first cluster from the first cluster, and assigning the second data record to an alternative cluster, to create a second alternative assignment of the data records;
   ascertaining a second modified measure of clustering quality corresponding with the second alternative assignment of the data records; and
   computing and recording a second difference score, wherein the second difference score is a difference between the initial measure of clustering quality and the second modified measure of clustering quality.

3. The non-transitory computer readable medium of claim 2, wherein the operations further comprise, for at least one cluster, generating a frequency distribution of difference scores for corresponding data records that initially assigned to the cluster.

4. The non-transitory computer readable medium of claim 3, wherein the operations further comprise identifying statistical relationships of difference scores to identify outliers, anomalies, and exemplars.

5. The non-transitory computer readable medium of claim 4, wherein the operations further comprise recording a measure of similarity between the resulting assignments of data to clusters, and the identification of outliers, anomalies, and exemplars.

6. The non-transitory computer readable medium of claim 4, wherein the operations further comprise:
   Recording a measure of similarity between the resulting assignments of data to clusters, and the identification of outliers, anomalies exemplars,
   using the recorded measure of similarity between the resulting assignments of data to clusters and the identification of outliers, anomalies, and exemplars to amplify or reduce the degree to which data records are identified as outliers, anomalies, and exemplars.

7. The non-transitory computer readable medium of claim 4, wherein the amount of confidence accorded to the identification of a data record as an outlier, anomaly, or exemplar is a function of the consistency in which the data record is identified as a respective outlier, anomaly, or exemplar when the data record is assigned to different alternative clusters.

8. A non-transitory computer readable medium tangibly embodying a program of machine-readable instructions executable by a digital processing apparatus to perform operations for detecting outliers, anomalies, and exemplars in clustered categorical data, the operations comprising:
   ascertaining an initial measure of clustering quality corresponding with an assignment of data records to clusters;
   removing a first data record that has been initially assigned to a first cluster from the first cluster, and assigning the first data record to an alternative cluster, to create a first alternative assignment of the data records;
   ascertaining a first modified measure of clustering quality corresponding with the first alternative assignment of the data records;
   computing and recording a first difference score, wherein the first difference score is a difference between the initial measure of clustering quality and the first modified measure of clustering quality;
   wherein the first data record is identified as an outlier if the measure of clustering quality is improved when the first data record is assigned to the alternative cluster.

9. A non-transitory computer readable medium tangibly embodying a program of machine-readable instructions executable by a digital processing apparatus to perform operations for detecting outliers, anomalies, and exemplars in clustered categorical data, the operations comprising:
   ascertaining an initial measure of clustering quality corresponding with an assignment of data records to clusters;
   removing a first data record that has been initially assigned to a first cluster from the first cluster, and assigning the first data record to an alternative cluster, to create a first alternative assignment of the data records;
   ascertaining a first modified measure of clustering quality corresponding with the first alternative assignment of the data records;
   computing and recording a first difference score, wherein the first difference score is a difference between the initial measure of clustering quality and the first modified measure of clustering quality;
   wherein the first data record is identified as an anomaly if the measure of clustering quality is not substantially improved and is not substantially degraded when the first data record is assigned to the alternative cluster.

10. A non-transitory computer readable medium tangibly embodying a program of machine-readable instructions executable by a digital processing apparatus to perform operations for detecting outliers, anomalies, and exemplars in clustered categorical data, the operations comprising:
    ascertaining an initial measure of clustering quality corresponding with an assignment of data records to clusters;
    removing a first data record that has been initially assigned to a first cluster from the first cluster, and assigning the first data record to an alternative cluster, to create a first alternative assignment of the data records;
    ascertaining a first modified measure of clustering quality corresponding with the first alternative assignment of the data records;
    computing and recording a first difference score, wherein the first difference score is a difference between the initial measure of clustering quality and the first modified measure of clustering quality;
    wherein the first data record is identified as an anomaly if a specified percentage of other data records have a greater effect on the measure of clustering quality than the first data record, when the other data records are assigned to one or more respective alternative clusters.

11. A non-transitory computer readable medium tangibly embodying a program of machine-readable instructions executable by a digital processing apparatus to perform operations for detecting outliers, anomalies, and exemplars in clustered categorical data, the operations comprising:
    ascertaining an initial measure of clustering quality corresponding with an assignment of data records to clusters;

removing a first data record that has been initially assigned to a first cluster from the first cluster, and assigning the first data record to an alternative cluster, to create a first alternative assignment of the data records;

ascertaining a first modified measure of clustering quality corresponding with the first alternative assignment of the data records;

computing and recording a first difference score, wherein the first difference score is a difference between the initial measure of clustering quality and the first modified measure of clustering quality;

wherein the first data record is identified as an exemplar if the measure of clustering quality is significantly reduced when the data record is assigned to the alternative cluster.

12. The non-transitory computer readable medium of claim 11, wherein the measure of clustering is significantly reduced is determined by whether a specified percentage of other data records have been less effects on the measure of clustering than the first data record, if the other data records are assigned to one or more respective alternate clusters.

13. A non-transitory computer readable medium tangibly embodying a program of machine-readable instructions executable by digital processing apparatus to perform operations for detecting outliers, anomalies, and exemplars in clustered categorical data, the operations comprising:

ascertaining an initial measure of clustering quality corresponding with an assignment of data records to clusters;

removing a first data record that has been initially assigned to a first cluster from the first cluster, and assigning the first data record to an alternative cluster, to create a first alternative assignment of the data records;

ascertaining a first modified measure of clustering quality corresponding with the first alternative assignment of the data records;

computing and recording a first difference score, wherein the first difference score is a difference between the initial measure of clustering quality and the first modified measure of clustering quality;

wherein the first data record is identified as an exemplar if the measure of clustering is significantly reduced when the first data record is assigned to the alternative cluster, wherein significance is determined by the percentage of other data records that have less effect on the measure of clustering than the first data record, when the other data records are assigned to one or more respective alternative clusters.

14. A method for detecting outliers, anomalies, and exemplars in clustered categorical data, the method comprising the following operations:

ascertaining an initial measure of clustering quality corresponding with an assignment of data records to clusters;

removing a first data record that has been initially assigned to a first cluster from the first cluster, and assigning the first data record to an alternative cluster, to create a first alternative assignment of the data records;

ascertaining a first modified measure of clustering quality corresponding with the first alternative assignment of the data records;

computing and recording a first difference score, wherein the first difference score is a difference between the initial measure of clustering quality and the first modified measure of clustering quality;

removing a second data record that has been initially assigned to the first cluster from the first cluster, and assigning the second data record to an alternative cluster, to create a second alternative assignment of the data records;

ascertaining a second modified measure of clustering quality corresponding with the second alternative assignment of the data records; and computing and recording a second difference score, wherein the second difference score is a difference between the initial measure of clustering quality and the second modified measure of clustering quality.

15. The method of claim 14, wherein the operations further comprise:

for at least one cluster, generating a frequency distribution of difference scores for corresponding data records that were initially assigned to the cluster; and identifying statistical relationships of difference scores to identify outliers, anomalies, and exemplars.

* * * * *